July 21, 1953  M. BEAUVAIS ET AL  2,646,175
DISPLAY RACK SUPPORT
Filed Feb. 27, 1948
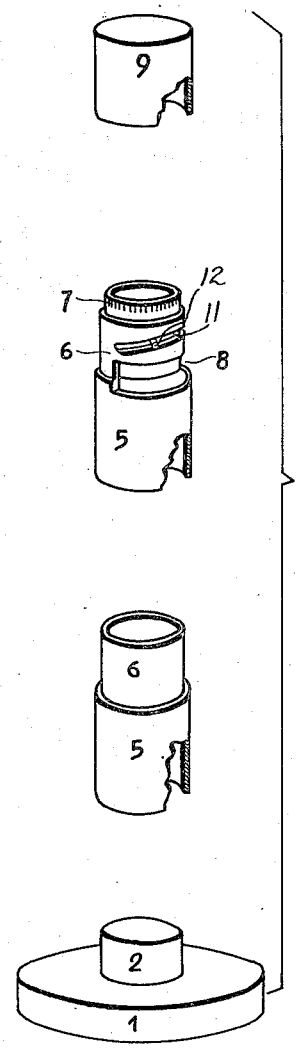
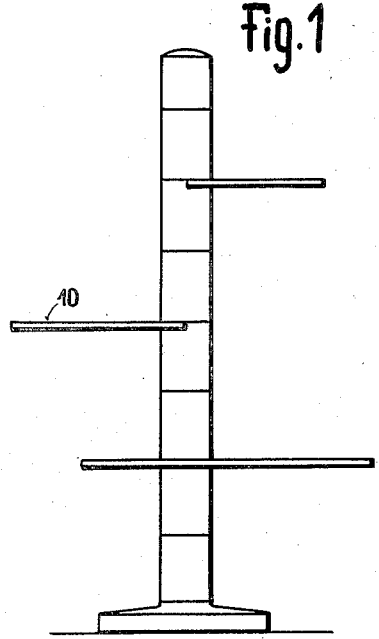
Inventors
Max Beauvais &
Guy Argyroglou Callias Bey
By Singer, Ehlert, Stern & Carlberg
Attorneys

Patented July 21, 1953

2,646,175

UNITED STATES PATENT OFFICE 2,646,175

DISPLAY RACK SUPPORT

Max Beauvais and Guy Argyroglou Callias Bey, Paris, France, assignors to Ernest Woog, Lausanne, Switzerland Application February 27, 1948, Serial No. 11,484
In France January 9, 1939

Section 1, Public Law 690, August 8, 1946
Patent expires January 9, 1959

2 Claims. (Cl. 211—148)

We already are acquainted with display rack supports comprising several elements held together by a central screw and having between them shelves or trays or other similar members which may be tightened when assembling.

We know, on the other hand, of supports comprising a column in one piece provided with slots in different horizontal planes and set off in their angular position one with respect to another. These slots are destined to receive shelves which are held at their edges.

Th aforesaid devices involve essential disadvantages as follows:

In the first mentioned case, assembling is complicated and requires tools which may permit a sufficient tightening to secure solidity of support and of the elements carried by said support on the one hand, and on the other hand, there is set a limit in height by the length of the central screw.

In the second mentioned case, the arrangement of the shelves or other elements sustained by the support is given by the position of the slots or gaps the column is provided with, which cannot be modified, in such a manner that it is not possible to modify the respective arrangement of the shelves in accordance with the display objects and in regard to aesthetic effect wanted. Moreover, the thickness of the shelves must correspond very accurately to the height of the slots or gaps the column is provided with.

The present invention has for its object a display rack support which does not show the aforesaid disadvantages.

For this purpose, the support comprises a base plate on which interchangeable elements interlocking between themselves are set up, whereof at least a part of them are each provided with a slot destined to receive the edge of a shelf or another similar member.

The attached drawing shows, as an example, one form of the invention.

Fig. 1 is a front-view of the support;

Fig. 2 shows at a larger scale the detail of the constituent elements of the support;

Fig. 3 shows a variant of detail.

As seen on the drawing, the support comprises a base plate 1 being for instance a casting which on its upper face has a protrusion 2 of cylindrical shape or any prismatic shape.

Every element of the support is constituted by a tubular piece 5 including a portion 6 of reduced diameter. The outside diameter of every portion 6 as well as the same of the protrusion 2 of the base plate 1 corresponds to the inside diameter of every part 5, in such manner that the so constituted elements interlock between themselves and on the base plate 1 as illustrated in Fig. 1 of the drawing.

Several of the elements are provided with a transverse slot 8 and their portion 6 contains a tubular piece 7 turning with friction against the inner surface. The portion 6 also is provided with a helical slot 11 wherein slides a protrusion 12 integral with the piece 7. Thus, an angular displacement of the pieces 5 and 7, one with respect to the other, provokes simultaneously a relative axial displacement of the two said pieces, which makes it possible to clamp a shelf 10 on the column by tightening it in the slot 8, on the edge of the said shelf 10, as shown in Fig. 1.

As may be seen in the drawing, the slot 8 extends from the larger diameter portion of part 5 into the smaller diameter portion 6 of the same. The thickness of the shelf or tray 10 has to be chosen so that, when it is set in position, it permits the part 5 of the upper element to interlock completely, in such a manner as to be closed flush together.

The portion 6 of the uppermost element of the support is covered by a cap 9.

It is clear that the tightening of a member, such as a shelf 10, in the slot 8 of an element of the support can be accomplished by other means than those above described. For instance, it could be provided inside the part 6 of an element 3 as a tightening screw 4 (Fig. 3).

The fact that the elements of the support are cylindrical permits the choice of the angular position of each slot 8 and consequently the angular position of each shelf at will. Thus, the gaps constituted by the slots 8 not in use, can be set on a side of the column not visible to the public.

It is obvious that the elements may have another cross-sectional shape and need not be circular in cross-section but, for instance, may be polygonal. Furthermore, the elements may be made of metal or any other material of sufficient strength.

The device of the present invention has the great advantage of constituting a support perfectly adapted to its purpose, that is to say, that by combining the several elements the support produced has very neat appearance. The support is not limited as to height but the latter may be changed by simply removing or adding tubular elements 5.

We claim:

1. A display rack support of the character described including a base, a plurality of support elements and a cap so united as to form an interlocked column in which each of said support elements comprise, a first tubular piece having one end portion of reduced diameter and provided with a circumferential slot in its wall spaced from both its ends, and a second tubular piece telescopically mounted within said first tubular piece at said portion of reduced diameter, one of said tubular pieces having a radially extending pin affixed to its wall, the other of said tubular pieces having an inclined slot in its wall, said pin extending into said inclined slot, whereby said tubular pieces move axially with respect to each other upon relative rotation, one end of said second tubular piece terminating adjacent said circumferential slot in said first tubular piece, so that upon relative rotation of said tubular pieces the effective width of said circumferential slot is varied, the inside diameter of said first tubular piece being equal to the outside diameter of said portion of reduced diameter so that adjoining support elements may be telescopically interlocked.

2. A display rack support comprising, a base plate having a centrally disposed upstanding cylindrical protrusion, a plurality of tubular pieces, each of said tubular pieces having a part of reduced diameter at one end, said cylindrical protrusion and said parts of reduced diameter being of equal outside diameter, said tubular pieces having at their other ends an inside diameter equal to the outside diameter of said cylindrical protrusion and said parts of reduced diameter, said tubular pieces being adapted to be affixed to said cylindrical protrusion or to said part of reduced diameter of an adjoining tubular piece to form an upstanding tubular column, and a cap affixed to the part of reduced diameter of the top tubular piece, each of said tubular pieces having in its wall a circumferential slot the width of which extends partially into said part of reduced diameter, said circumferential slot extending substantially half way around said tubular piece, each of said tubular pieces including a second tubular piece telescopically mounted within said part of reduced diameter, one end of said second tubular piece terminating adjacent said circumferential slot, the other end of said second tubular piece terminating adjacent the end of said tubular piece having said part of reduced diameter and projecting outwardly therefrom, one of said tubular pieces having a pin affixed to its wall, the other of said tubular pieces having an inclined slot in its wall, said pin extending into said inclined slot, said second tubular piece being axially movable with respect to said tubular piece upon relative rotation by virtue of said pin and said inclined slot, whereby said second tubular piece varies the effective width of said circumferential slot in said tubular piece, said slot being provided for receiving an article to be supported by said rack support.

MAX BEAUVAIS.
GUY ARGYROGLOU CALLIAS BEY.

References Cited in the file of this patent

UNITED STATES PATENTS

| Number | Name | Date |
|---|---|---|
| 407,374 | Smith | July 23, 1889 |
| 1,688,048 | Irvine | Oct. 16, 1928 |
| 1,878,765 | Ehrlich | Sept. 20, 1932 |

FOREIGN PATENTS

| Number | Country | Date |
|---|---|---|
| 500,100 | France | Dec. 6, 1919 |
| 325,342 | Great Britain | Feb. 20, 1930 |
| 447,053 | Great Britain | May 6, 1936 |
| 189,611 | Switzerland | June 1, 1937 |